US010703891B2

(12) United States Patent
Herklots et al.

(10) Patent No.: US 10,703,891 B2
(45) Date of Patent: Jul. 7, 2020

(54) COMPOSITION COMPRISING HETEROPHASIC PROPYLENE COPOLYMER

(71) Applicant: SABIC GLOBAL TECHNOLOGIES B.V., Bergen op Zoom (NL)

(72) Inventors: Marc Herklots, Roermond (NL); Désirée Marie Louise Seegers, Geleen (NL); Ralf Kleppinger, Selfkant (DE); Timo Olavi Latvakangas, Maastricht (NL); Eddy Jozef Agnes van de Gaar, Urmond (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 42 days.

(21) Appl. No.: 16/078,099

(22) PCT Filed: Feb. 21, 2017

(86) PCT No.: PCT/EP2017/053952
§ 371 (c)(1),
(2) Date: Aug. 21, 2018

(87) PCT Pub. No.: WO2017/144475
PCT Pub. Date: Aug. 31, 2017

(65) Prior Publication Data
US 2019/0062542 A1    Feb. 28, 2019

(30) Foreign Application Priority Data

Feb. 22, 2016  (EP) .................................... 16156712
Feb. 22, 2016  (EP) .................................... 16156714
Feb. 22, 2016  (EP) .................................... 16156715
Nov. 16, 2016  (EP) .................................... 16199022

(51) Int. Cl.
| | | |
|---|---|---|
| C08L 23/14 | (2006.01) |
| C08K 3/34 | (2006.01) |
| C08K 5/098 | (2006.01) |
| C08K 5/20 | (2006.01) |
| C08L 23/12 | (2006.01) |
| C08L 23/16 | (2006.01) |
| C08K 5/06 | (2006.01) |
| C08F 210/16 | (2006.01) |
| C08F 110/06 | (2006.01) |
| C08J 3/20 | (2006.01) |

(52) U.S. Cl.
CPC .......... *C08L 23/142* (2013.01); *C08F 110/06* (2013.01); *C08F 210/16* (2013.01); *C08J 3/201* (2013.01); *C08K 3/34* (2013.01); *C08K 5/06* (2013.01); *C08K 5/098* (2013.01); *C08K 5/20* (2013.01); *C08L 23/12* (2013.01); *C08L 23/16* (2013.01); *C08L 2205/025* (2013.01); *C08L 2205/24* (2013.01); *C08L 2207/02* (2013.01)

(58) Field of Classification Search
CPC ............... C08L 23/142; C08L 2205/24; C08L 2205/025; C08L 2207/02; C08J 3/201
USPC ......................................................... 524/232
See application file for complete search history.

(56) References Cited

U.S. PATENT DOCUMENTS

| | | | |
|---|---|---|---|
| 4,282,076 A | 8/1981 | Boynton | |
| 4,399,054 A | 8/1983 | Ferraris et al. | |
| 4,463,113 A | 7/1984 | Nakahara et al. | |
| 4,472,524 A | 9/1984 | Albizzati | |
| 5,049,605 A | 9/1991 | Rekers | |
| 5,342,868 A | 8/1994 | Kimura et al. | |
| 6,465,551 B1 | 10/2002 | Zhao et al. | |
| 6,534,574 B1 | 3/2003 | Zhao et al. | |
| 2011/0097577 A1* | 4/2011 | Soliman .................. | C08K 5/20 428/339 |
| 2011/0207883 A1 | 8/2011 | Doufas et al. | |
| 2013/0253124 A1* | 9/2013 | Bernreiter ............... | C08L 23/10 524/528 |
| 2015/0232652 A1* | 8/2015 | Herklots ................. | C08L 23/08 524/229 |
| 2018/0134868 A1* | 5/2018 | Vandewiele ............. | C08K 5/14 |

FOREIGN PATENT DOCUMENTS

| | | |
|---|---|---|
| EP | 0063654 A1 | 11/1982 |
| EP | 0940431 A1 | 9/1999 |
| EP | 1344793 A1 | 9/2003 |
| EP | 2397517 A1 | 12/2011 |
| EP | 2452976 A1 | 5/2012 |
| WO | 2004072168 A2 | 8/2004 |
| WO | 2005063870 A1 | 7/2005 |
| WO | 2006010414 A1 | 2/2006 |
| WO | 2014202603 A1 | 12/2014 |
| WO | 2014202604 A1 | 12/2014 |

OTHER PUBLICATIONS

International Search Report for International Application No. PCT/EP2017/053952; International Filing Date: Feb. 21, 2017; dated Mar. 22, 2017; 4 Pages.

(Continued)

*Primary Examiner* — Hui H Chin
(74) *Attorney, Agent, or Firm* — Cantor Colburn LLP

(57) ABSTRACT

The invention relates to a composition comprising a heterophasic propylene copolymer and a C10-C30 aliphatic carboxylic acid amide, wherein the heterophasic propylene copolymer consists of a propylene-based matrix consisting of a propylene homopolymer and/or a propylene-α-olefin copolymer consisting of at least 70 wt % of propylene and at most 30 wt % of α-olefin and wherein the propylene-based matrix is present in an amount of 76 to 90 wt % based on the total heterophasic propylene copolymer and a dispersed ethylene-α-olefin copolymer, wherein the dispersed ethylene-α-olefin copolymer is present in an amount of 24 to 10 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 30 to 38 wt %.

20 Claims, No Drawings

(56) References Cited

OTHER PUBLICATIONS

Written Opinion of the International Searching Authority for International Application No. PCT/EP2017/053952; International Filing Date: Feb. 21, 2017; dated Mar. 22, 2017; 7 Pages.

* cited by examiner

COMPOSITION COMPRISING HETEROPHASIC PROPYLENE COPOLYMER

CROSS REFERENCE TO RELATED APPLICATIONS

This application is a 371 of International Application No. PCT/EP2017/053952, filed Feb. 21, 2017, which claims priority to European Application Serial Nos. 16199022.1 filed Nov. 16, 2016, 16156714.4 filed Feb. 22, 2016, 16156715.1 filed Feb. 22, 2016, and 16156712.8 filed Feb. 22, 2016, which are incorporated herein by reference in their entirety.

The invention relates to a composition comprising a heterophasic propylene copolymer, to a process for obtaining such composition, to the use of such composition and an article comprising such composition.

Heterophasic propylene copolymer, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Many articles can be made by injection moulding of a heterophasic propylene copolymer. For injection moulding, the heterophasic propylene copolymer must have a relatively high flowability. Further, many applications of the heterophasic propylene copolymer require a good balance of impact strength and stiffness, as well as a sufficiently high gloss. It would be desirable to provide a composition which has these desirable properties and which has a flowability sufficient for injection moulding.

Therefore, it is an object of the invention to provide a heterophasic polypropylene composition having a good balance of impact strength and stiffness in combination with a sufficiently high gloss and which have a flowability sufficient for injection moulding.

This object is achieved by a composition comprising (A) a heterophasic propylene copolymer and (B) a C10-C30 carboxylic acid amide, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 76 to 90 wt % based on the total heterophasic propylene copolymer and (b) a dispersed ethylene-α-olefin copolymer, wherein the dispersed ethylene-α-olefin copolymer is present in an amount of 24 to 10 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 30 to 40 wt % and wherein the propylene-based matrix has a melt flow index $MFI_{PP}$ as determined according to ISO1133 at 230° C. and 2.16 kg and the dispersed ethylene-α-olefin elastomer has a melt flow index $MFI_{EPR}$ as determined according to ISO1133 at 230° C. and 2.16 kg, wherein the ratio of $MFI_{PP}/MFI_{EPR}$ is 0.5-15 and wherein the heterophasic propylene copolymer has a melt flow index of 10 to 100 dg/min as determined according to ISO1133 at 230° C. and 2.16 kg.

Preferably, this object is achieved by a composition comprising (A) a heterophasic propylene copolymer and (B) a C10-C30 aliphatic carboxylic acid amide, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 76 to 90 wt % based on the total heterophasic propylene copolymer and (b) a dispersed ethylene-α-olefin copolymer, wherein the dispersed ethylene-α-olefin copolymer is present in an amount of 24 to 10 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 30 to 38 wt % and wherein the propylene-based matrix has a melt flow index $MFI_{PP}$ as determined according to ISO1133 at 230° C. and 2.16 kg and the dispersed ethylene-α-olefin elastomer has a melt flow index $MFI_{EPR}$ as determined according to ISO1133 at 230° C. and 2.16 kg, wherein the ratio of $MFI_{PP}/MFI_{EPR}$ is 0.5-15 and wherein the heterophasic propylene copolymer has a MFI of 10 to 100 dg/min as determined according to ISO1133 at 230° C. and 2.16 kg.

The composition according to the invention has a flowability which is suitable for use in injection moulding. According to the present invention, it has surprisingly been found that the composition according to the invention shows a good balance of impact strength and stiffness in combination with a sufficiently high gloss. Further, the composition according to the invention has a good scratch resistance. The use of the amide (B) leads to significantly better scratch resistance compared to the cases where no amide is used.

Further, the composition according to the invention may have a good (low) stress whitening property.

Compared to known compositions comprising heterophasic propylene copolymer, the composition according to the invention offers excellent optical properties whilst having good mechanical properties.

Compared to ABS (acrylonitrile butadiene styrene), the composition according to the invention has comparable optical properties and scratch resistance, with an optimal balance of impact strength and stiffness that could be suited for overdesigned applications where ABS was typically used. Replacement of ABS with the composition according to the invention may offer advantages such as material cost savings; weight saving due to lower density; cycle time reduction from faster crystallization and cooling; good processability due to high flow; and thinner wall and downgauging. Such replacement may also achieve energy savings by the fact that there is no need for pre-drying and lower barrel temperature, lower injection pressures and lower mould temperature are required.

It was observed that the ratio of $MFI_{PP}/MFI_{EPR}$ has a large influence on both the scratch resistance and the impact strength. Typically, $MFI_{PP}$ is much higher than $MFI_{EPR}$ in a heterophasic propylene copolymer, for example $MFI_{PP}/MFI_{EPR}$ may be as high as 100. It has been found according to the invention that similar MFI between the matrix and the rubber phase leads to a better dispersion of the rubber phase. Although not wishing to be bound by any theory, it appeared that the better dispersion of the rubber phase led to a higher scratch resistance and a higher impact strength. The ratio of $MFI_{PP}/MFI_{EPR}$ is 0.5-15, preferably 0.5-12, more preferably 0.5-10, more preferably 0.5-6, more preferably 0.5-3, most preferably 0.5-1.5.

The ratio of $MFI_{PP}/MFI_{EPR}$ is for example at least 0.5, at least 0.6, at least 0.7, at least 0.8 or at least 0.9, and/or for example at most 15, at most 12, at most 10, at most 6, at most 3, at most 1.5 or at most 1.2.

It is noted that WO2009/138211 describes a moulded article made from a polypropylene composition comprising (a) 48-94.9 mass % of a polypropylene, (b) 5-30 mass % of glass fibres, (c) 0.1-2 mass % of oleamide and/or erucamide and (d) 0-20 mass % of other additives. The polypropylene can be a propylene impact copolymer consisting of 50-95 mass % of a crystalline propylene-based matrix and 50-5 mass % of a dispersed elastomeric phase (e.g. ethylene-propylene rubber). The ethylene-propylene copolymer can have an ethylene content of 10-80 mass %, but preferred is an ethylene content of 50-75 mass %. The MFI of the matrix phase or the elastomeric phase in the propylene impact copolymer is not mentioned.

EP1344793 discloses a polyolefin composition comprising a heterophasic propylene copolymer containing and a beta-nucleating agent. The ethylene content in the rubber phase in the heterophasic propylene copolymer is 40-60 wt %. EP1344793 discloses N,N'-dicyclohexyl-2,6-naphtalene dicarboxamide, but not a C10-C30 aliphatic carboxylic acid amide. EP1344793 does not disclose the ratio between the MFI of the matrix and the MFI of the rubber phase.

US2011/207883 discloses an impact-resistant olefin polymer composition comprising a propylene based matrix and an ethylene-containing polymer including an ethylene-propylene rubber copolymer having a molecular weight higher than the weight average molecular weight of the propylene based matrix. US2011/207883 does not disclose the MFR ratio between the matrix and the ethylene-propylene rubber copolymer. US2011/207883 does not disclose a C10-C30 aliphatic carboxylic acid amide.

(A) Heterophasic Propylene Copolymer

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by NMR, as well known in the art.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms, for example ethylene, 1-butene, 1-pentene, 4-methyl-1-pentene, 1-hexen, 1-heptene or 1-octene, and is preferably ethylene.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene-α-olefin copolymer. This is particularly advantageous when the application of the composition of the present invention is used for packaging and other appliances where a good scratch resistance is important.

The melt flow index (MFI) of the propylene-based matrix (before it is mixed into the composition of the invention), $MFI_{PP}$, may be for example at least 0.1 dg/min, at least 0.2 dg/min, at least 0.3 dg/min, at least 0.5 dg/min, at least 1 dg/min, at least 1.5 dg/min, at least 2 dg/min, at least 3 dg/min, at least 5 dg/min, and/or for example at most 50 dg/min, at most 40 dg/min, at most 30 dg/min, at most 25 dg/min, at most 20 dg/min, measured according to ISO1133 (2.16 kg/230° C.). The $MFI_{PP}$ may be in the range of for example 0.1 to 50 dg/min, for example from 0.2 to 40 dg/min, for example 0.3 to 30 dg/min, for example 0.5 to 25 dg/min, for example from 1 to 20 dg/min, for example from 1.5 to 10 dg/min, for example from 2 to 10 dg/min, for example from 3 to 10 dg/min, for example from 5 to 10 dg/min, measured according to ISO1133 (2.16 kg/230° C.).

The propylene-based matrix is present in an amount of 76 to 90 wt %, for example at least 80 wt % and/or for example at most 89 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM).

The MFI of the dispersed ethylene α-olefin copolymer (before it is mixed into the composition of the invention), $MFI_{EPR}$, may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min or at most 3 dg/min. The $MFI_{EPR}$ may be in the range for example from 0.001 to 30 dg/min, for example from 0.01 to 20 dg/min, for example 0.1 to 15 dg/min, for example 0.3 to 10 dg/min, for example from 0.7 to 5 dg/min, for example from 1 to 3 dg/min. The MFI of the dispersed ethylene α-olefin copolymer ($MFI_{EPR}$) is calculated taking into account the MFI of the propylene-based matrix ($MFI_{PP}$) measured according to ISO1133 (2.16 kg/230° C.), the MFI of the heterophasic propylene copolymer (MFIheterophasic) measured according to ISO1133 (2.16 kg/230° C.) and the amount of the propylene-based matrix in the heterophasic propylene copolymer (matrix content) and the amount of the dispersed phase in the heterophasic propylene copolymer (rubber content (RC)) according to the following formula:

$$MFIEPR = 10^{\wedge}\left(\frac{\text{Log } MFIheterophasic - \text{matrix content} * \text{Log } MFIPP}{\text{rubber content}}\right)$$

The dispersed ethylene-α-olefin copolymer is present in an amount of 24 to 10 wt %, for example in an amount of at most 20 wt % and/or for example at least 11 wt % based on the total heterophasic propylene copolymer.

In the heterophasic polypropylene in the composition of the invention, the sum of the total weight of the propylene-based matrix and the total weight of the dispersed ethylene-α-olefin copolymer is 100 wt %

The amount of ethylene in the ethylene-α-olefin copolymer is in the range of 30 to 40 wt % based on the ethylene-α-olefin copolymer. More preferably, the amount of ethylene in the ethylene-α-olefin copolymer is 32 to 38 wt %.

Preferably, the heterophasic propylene copolymer has fraction soluble in p-xylene (CXS) of 24 to 10 wt %, for example 20 to 11 wt %, measured according to ISO 16152: 2005. CXS is denoted the fraction of the polypropylene copolymer that is soluble in p-xylene at 25° C.

Preferably, the amount of ethylene in the heterophasic propylene copolymer (sometimes referred as TC2) is in the range of 3-8 wt % or 3-7 wt % based on the heterophasic propylene copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The MFI of the heterophasic propylene copolymer is in the range of 10 to 100 dg/min, measured according to ISO1133 (2.16 kg/230° C.). Such a range of MFI is suitable for injection moulding.

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with component (B) and optional component (C) to obtain the composition according to the invention. The value of the MFI of the heterophasic propylene copolymer (MFI heterophasic) refers to the final MFI of the heterophasic propylene copolymer. To exemplify this:

In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the composition comprising the heterophasic propylene copolymer after such vis-breaking or shifting.

(B) Amide

The composition according to the invention also comprises a C10-C30 aliphatic carboxylic acid amide. A C10-C30 aliphatic carboxylic acid amide has an amide group $CONH_2$ group and a long alkyl tail. The C10-C30 carboxylic acid amide is represented by the formula $R^1$—$CONH_2$, wherein $R^1$ is a linear or branched C9-C29 alkyl group. The C10-C30 aliphatic carboxylic acid amide can be saturated C10-30 carboxylic acid amides or unsaturated C10-C30 carboxylic acid amides or mixtures thereof. In the unsaturated carboxylic acid amides at least one carbon-carbon double bond is present in the long alkyl tail.

Examples of saturated carboxylic acid amides are stearamide, palmitamide, cocamide, lauricamide, myristamide, capricamide, tallowamide, myristicamide, margaric (daturic) amide, arachidic amide, behenic amide, lignoceric amide, cerotic amide, montanic amide, melissic amide, lacceroic amide, ceromelissic (psyllic) amide, geddic amide and 9-octadecen amide.

Examples of unsaturated carboxylic acid amides are oleamide, linoleic amide, erucamide, myristoleic amide, palmitoleicamide, sapienic amide, elaidic amide, vaccenic amide, arachidonic amide, eicosapentaenoic amide and decosahexaenoic amide.

The number of carbon atoms in the carboxylic acid amides is 10-30, preferably 12-28, more preferably 14-26, most preferably 16-24.

The carboxylic acid amides are preferably unsaturated C10-C30 carboxylic acid amides, more preferably the carboxylic acid amides are chosen from erucamide and oleamide.

The amount of amides (B) in the composition is preferably between 0.01-1 wt %, preferably 0.05-0.8 wt %, more preferably 0.1-0.5 wt %, based on the total weight of the composition.

(C) Optional Components

The composition according to the invention may optionally comprise at least one optional component (C). Examples of optional components (C) are peroxides and other additives. The amount of the optional component (C) is typically 0 to 30 wt % of the total of the composition.

Peroxides

In some embodiments, the composition according to the invention can be obtained by melt-mixing a peroxide with components (A) and (B). The composition obtained by the addition of a peroxide has a different (higher) MFI from the MFI of the heterophasic copolymer used in preparing the composition. This step is also known in the art as visbreaking or shifting. The term "visbreaking" is well known in the field of the invention. For example methods of visbreaking polypropylene have been disclosed in U.S. Pat. No. 4,282,076 and EP 0063654. It is also possible to first melt-mix a peroxide with component (A), which changes the melt flow index of the heterophasic propylene copolymer, and then mix with component (B).

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

When a peroxide is used, the amount of peroxide will typically lie in the range of 0.02 to 0.5 wt % based on the heterophasic propylene copolymer.

In some embodiments, the composition according to the invention is prepared without using a peroxide.

Additives

The composition according to the invention may further comprise additives. The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene.

The skilled person can readily select any suitable combination of additives and additive amounts without undue experimentation. The amount of the additives depends on their type and function and typically is of from 0 to about 30 wt %. The amount of the additives may e.g. be from about 1 to about 20 wt %; from about 2 to about 10 wt % or of from 3 to about 5 wt % based on the total composition.

In particular, the composition according to the invention may comprise a nucleating agent, typically in the amount of 0.1 to 5 wt %, more preferably from 0.2 to 4 wt % or from 0.3 to 3 wt %, based on the total composition.

For purpose of the invention with nucleating agent is meant any material that effectively accelerates the phase change from liquid polymer to semi-crystalline polymer (evident via faster crystallization rates measured with a differential scanning calorimeter or small crystallites observed with an optical microscope). For the avoidance of doubt, C10-C30 aliphatic carboxylic acid amides (component (B)) are not considered to be nucleating agents.

Examples of nucleating agents are 2,6-naphthalene dicarboxamides, aliphatic mono- and di-carboxylate salts such as calcium pimelate and calcium suberate; and polyvinylcyclohexane.

Phosphate esters suitable for use as the nucleating agent include, but are not limited to, sodium 2,2'-methylene-bis-(4,6-di-tert-butylphenyl)phosphate (from Asahi Denka Kogyo K. K., known as "NA-11™"), aluminum hydroxy bis[2,2'-methylene-bis-(4,6-di-tert-butylphenyl)phosphate] (from Asahi Denka Kogyo K.K., known as "NA-21™"), and other such phosphate esters as disclosed for example in U.S. Pat. Nos. 5,342,868 and 4,463,113.

Bicyclic dicarboxylate metal salts suitable for use as the nucleating agent include, but are not limited to, those salts described in U.S. Pat. Nos. 6,465,551 and 6,534,574. The bicyclic salts having the structure shown below:

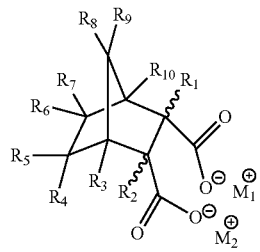

wherein $M_1$ and $M_2$ are independently selected from the group consisting of: sodium, calcium, strontium, lithium, zinc, magnesium, and monobasic aluminum; wherein $R_1$, $R_2$, $R_3$, $R_4$, $R_5$, $R_6$, $R_7$, $R_8$, $R_9$, and $R_{10}$ are independently selected from the group consisting of: hydrogen and $C_1$-$C_9$ alkyls; and further wherein any two adjacently positioned $R_3$-$R_{10}$ alkyl groups optionally may be combined to form a carbocyclic ring. In particular, suitable bicyclic dicarboxylate metal salts include disodium bicyclo[2.2.1]heptane-2,3-dicarboxylate, calcium bicyclo[2.2.1]heptane-2,3-dicarboxylate, and combinations thereof. One may employ HYPERFORM® HPN-68 or HPN-68L from Milliken & Company of Spartanburg, S.C. HPN-68L is commercially sold, and comprises the disodium bicyclo [2.2.1] heptane-2,3-dicarboxylate, as shown below:

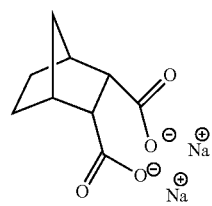 [SMILES: O=C([O-])C1C2CCC(C2)C1C(=O)[O-] ; [Na+] ; [Na+]]

Metal salts of hexahydrophthalic acid (HHPA) are known to the person skilled in the art. Such compounds may be as shown:

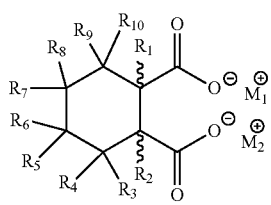

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. In one preferred embodiment, the $M_1$ and $M_2$ are combined as a calcium ion.

Di-acetal derivatives, which may be used as nucleating agent include, but are not limited to, alditol acetals, such as the sorbitol di-acetals described in U.S. Pat. No. 5,049,605. Suitable di-acetal derivatives preferably conform to the formula

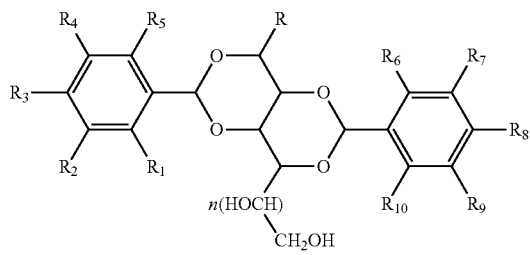

In this formula, n typically is a value selected from 0, 1, or 2. R typically is selected from the group consisting of hydrogen, alkenyl (such as allyl), alkyl, alkoxy, hydroxyl-alkyl, alkyl-halide, aromatic and substituted aromatic groups. $R_1$, $R_2$, $R_3$, $R_4$, $R_5$, $R_6$, $R_7$, $R_8$, $R_9$, and $R_{10}$ typically are independently selected from the group consisting of hydrogen, fluorocarbons, alkenyl, alkyl, alkynyl, alkoxy, carboxy, halides, amino, thioether and aromatic groups. In certain embodiments, any two adjacent groups selected from $R_1$, $R_2$, $R_3$, $R_4$, $R_5$, $R_6$, $R_7$, $R_8$, $R_9$, and $R_{10}$ may be combined to form a cyclic group selected from the group consisting of methylenedioxy, cyclopentyl, cyclohexyl, or other similar cyclic groups. In certain embodiments, the nucleating agent preferably is 1,3:2,4-bis(3,4-dimethylbenzylidene) sorbitol (hereinafter DMDBS), available from Miliiken Chemical under the trade name Millad® 3988.

Di-, tri-, and tetra-amides suitable for use as the nucleating agent include, but are not limited to: di- and tri-amides containing amide cores comprised of either single and fused 4,5,6,7-membered aromatic or cycloaliphatic rings; di- and tri-amides containing amide cores comprised of di and tri aliphatic carboxylic acids or di and tri aliphatic amines; and tri- and tetra-amides containing amide cores comprised of aliphatic tri- and tetracarboxylic acids and aliphatic or cycloaliphatic amines. These compounds are exemplified in patent publications, including WO 2004072168, EP 0940431 and WO 200506387.

In particular, the composition according to the invention may comprise a nucleating composition comprising a first nucleating agent, which comprises a cyclic dicarboxylate salt compound; and a second nucleating agent, which comprises talc, wherein the cyclic dicarboxylate salt compound has the formula (I):

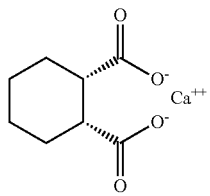

Such nucleating compositions are as described in WO2014202603 and WO2014202604.

Hyperform® HPN-20E™ nucleating agent commercialized by Milliken comprises such a calcium cis-hexahydrophthalate compound of Formula (I) and a stearate-containing compound as acid scavenger, e.g. zinc stearate. The amount of the first nucleating agent may be from 0.0025 to 0.1 wt % based on the total composition; preferably at least 0.004, 0.005, 0.008, 0.01 wt % and/or at most 0.08, 0.06, 0.05, 0.03 wt %, based on the total composition. The amount of talc used as second nucleating agent in the polymer composition is preferably of from 0.1 to 5 wt %, more preferably from 0.2 to 4 wt %; or from 0.3 to 3 wt %, based on the total composition.

The presence of the nucleating composition in the composition according to the invention has an advantage that the composition has a high stiffness represented by the high flexural modulus.

The sum of all components added in the process of the invention to form the composition comprising (A) the heterophasic propylene copolymer, (B) the amide and (C) the optional components should add up to 100% by weight.

Preferably, the total of components (A) and (B) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

The invention further relates to a composition comprising no or little amount of a polypropylene homopolymer as an additional component to components (A) and (B). The amount of the polypropylene homopolymer in the composition according to the invention may be at most 5 wt %, at most 4 wt %, at most 3 wt %, at most 1 wt %, at most 0.5 wt %, at most 0.1 wt % or 0 wt %.

In some embodiments, the composition according to the invention comprises impact modifiers such as ethylene-α-olefin copolymer as an additional component to components (A) and (B). The amount of the impact modifiers may e.g. be 5 to 30 wt %, e.g. 10 to 25 wt %, e.g. 15 to 20 wt %. The invention further relates to a composition comprising no or little amount of impact modifiers such as ethylene-α-olefin copolymer as an additional component to components (A) and (B). The amount of the impact modifiers such as ethylene-α-olefin copolymer in the composition according to the invention may be at most 5 wt %, at most 4 wt %, at most 3 wt %, at most 1 wt %, at most 0.5 wt %, at most 0.1 wt % or 0 wt %.

Process

The composition of the invention may be obtained by a process comprising melt-mixing (A) the heterophasic copolymer, (B) the amide and (C) the optional component by using any suitable means. Accordingly, the invention further relates to a process for the preparation of the composition according to the invention comprising melt mixing (A) and (B) and optionally (C). Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B) and optionally (C) are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

Properties

The MFI of the heterophasic propylene copolymer according to the invention is in the range of 10 to 100 dg/min measured according to ISO1133 (2.16 kg/230° C.). Such a range of MFI is suitable for injection moulding.

Preferably, the composition according to the invention has a scratch resistance expressed by a colour change dL of at most 1.4, more preferably at most 1.0, more preferably at most 0.5, more preferably at most 0.4, more preferably at most 0.3, more preferably at most 0.2, more preferably at most 0.1, as measured according to the PV 3952 2002 scratch method of Volkswagen AG company with a load of 10N, wherein the colour change dL is the difference in the L values of CIELAB measured according to ASTM D6290-05 and ASTM E313.

Preferably, the composition according to the invention has a scratch resistance expressed by a colour change dL of at most 5, more preferably at most 3, more preferably at most 1, as measured according to the PV 3952 2002 scratch method of Volkswagen AG company with a load of 15N, wherein the colour change dL is the difference in the L values of CIELAB measured according to ASTM D6290-05 and ASTM E313.

Preferably, the composition according to the invention has a scratch resistance expressed by a colour change dL of at most 15, more preferably at most 13, more preferably at most 10 as measured according to the PV 3952 2002 scratch method of Volkswagen AG company with a load of 20N, wherein the colour change dL is the difference in the L values of CIELAB measured according to ASTM D6290-05 and ASTM E313.

Preferably, the composition according to the invention has an Izod impact strength at 23° C. according to ISO 180 4A (test geometry: 65*12.7*3.2 mm, notch 45° according to ISO 37/2 perpendicular orientation) of at least 5 kJ/m$^2$, more preferably at least 6 kJ/m$^2$, more preferably at least 7 kJ/m$^2$, more preferably at least 8 kJ/m$^2$.

Preferably, the composition according to the invention has an Izod impact strength at 0° C. according to ISO 180 4A (test geometry: 65*12.7*3.2 mm, notch 45° according to ISO 37/2 perpendicular orientation) of at least 3 kJ/m$^2$, more preferably at least 4 kJ/m$^2$, more preferably at least 5 kJ/m$^2$.

Preferably, the composition according to the invention has an Izod impact strength at −20° C. according to ISO 180 4A (test geometry: 65*12.7*3.2 mm, notch 45° according to ISO 37/2 perpendicular orientation) of at least 1.6 kJ/m$^2$, more preferably at least 2 kJ/m$^2$, more preferably at least 3 kJ/m$^2$.

Preferably, the composition according to the invention has a flexural modulus according to ASTM D790-10 at 23° C. in parallel orientation (test specimen: 3.2 mm according to ISO 37/2) of at least 1200 MPa, more preferably at least 1300 MPa, more preferably at least 1400 MPa, more preferably at least 1500 MPa.

Preferably, the composition according to the invention has a high gloss. Gloss is the amount of light reflected in a certain direction by a surface of a sample made from the composition. The measurement scale of gloss, Gloss Units (GU), of a glossmeter (BYK Gardner micro-TRI-gloss) is a scaling based on a highly polished reference black glass standard with a defined refractive index having a specular reflectance of 100 GU at the specified angle. This standard is used to establish an upper point calibration of 100 with the lower end point established at 0 on a perfectly matte surface. The samples used for this test may be obtained by injection moulding ISO 37/2 on the machine Arburg 60T, mould: 1-1-1-108, with geometry 65*65*3.2 mm.

Preferably, the composition according to the invention has a gloss as determined according to ISO 2813 and DIN67530 at a measurement angle of 20° of at least 60 GU, more preferably at least 65 GU.

Preferably, the composition according to the invention has a gloss as determined according to ISO 2813 and DIN67530 at a measurement angle of 60° of at least 75 GU, more preferably at least 80 GU. Preferably, the composition according to the invention has a gloss as determined according to ISO 2813 and DIN67530 at a measurement angle of 85° of at least 90 GU, more preferably at least 95 GU.

Preferably, the composition according to the invention has good (low) stress whitening. Stress whitening is the appearance of a white area on an object when the object is stressed after a blushing operation. The appearance of the white area indicates that there is an onset of failure of the corresponding material.

The blushing on the samples is created according to PV3905, by dropping a solid stainless steel ball (● (50.0±0.03) mm) of 500 (±5) grams from a height of 230 mm on a test piece with dimension 65*65*3.2 mm injected on the machine Arburg 60T, mould: 1-1-1-108, according to ISO 37/2.

Photos of these test pieces are taken with a SLR digital camera (Canon 6D; 100 macro lens including an extender) under illumination conditions such that the test pieces are homogeneously illuminated.

Image analysis of the photos is done using a Matlab Graphical Interface (GUI) in order to determine the values of the parameter "spot size". The parameter "spot size" or "stress whitening value" indicates the dimensional visibility of the white area. The terms spot size and stress whitening value can be used interchangeably.

The spot size is determined as follows:

The photo contains pixels representing a defined area of the photo. The intensity of each pixel of the photo is determined. At the borders of the picture, outside the area where the sample has been blushed (which causes a white spot), reference material is present which has a certain intensity $I_{ref}$. Intensity of pixels of the white spot ($I_{spot}$) are determined by measuring the actual intensity of a pixel and subtracting this value with $I_{ref}$. A pixel lies within a spot, when the $I_{spot}$ is larger than $I_{ref}*1.05$. In this way noise which may be present in the reference material is filtered out and not taken into account in determining the spot size.

The spot size is the sum of all pixels which have a $I_{spot} > I_{ref}*1.05$.

Preferably, the composition according to the invention has a stress whitening value lower than 350 mm² as determined according to PV3905, after conditioning for 24 hours at 23° C., by dropping a stainless steel ball of 500 grams from a height of 230 mm on a test piece of 65*65*3.2 mm. The stress whitening value is preferably lower than 300 mm², for example lower than 250 mm², for example lower than 200 mm², for example lower than 150 mm², lower than 120 mm², lower than 100 mm² or lower than 80 mm².

Further Aspects

The composition according to the invention may then be processed by any conventional technique known in the art into an article. Suitable examples of processing techniques wherein the composition according to the invention may be used include injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, thermoforming or thin-walled injection moulding.

The invention further relates to an article comprising the composition according to the invention. In particular, the invention relates to an article comprising the composition according to the invention, wherein the article is made by injection moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Preferably, the article according to the invention is consumer appliances such as housings for household, electrical appliance and garden power tools.

The invention further relates to the use of the article comprising the composition according to the invention for consumer appliances such as housings for household, electrical appliance and garden power tools.

The invention also relates to the use of a C10-C30 carboxylic acid amide for improving the scratch resistance of an article made of a composition comprising a heterophasic propylene copolymer, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 76 to 90 wt % based on the total heterophasic propylene copolymer and (b) a dispersed ethylene-α-olefin copolymer, wherein the dispersed ethylene-α-olefin copolymer is present in an amount of 24 to 10 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 30 to 40 wt % and wherein the propylene-based matrix has a melt flow index $MFI_{PP}$ as determined according to ISO1133 at 230° C. and 2.16 kg and the dispersed ethylene-α-olefin elastomer has a melt flow index $MFI_{EPR}$ as determined according to ISO1133 at 230° C. and 2.16 kg, wherein the ratio of $MFI_{PP}/MFI_{EPR}$ is 0.5-15 and wherein the composition has a MFI of 10 to 100 dg/min as determined according to ISO1133 at 230° C. and 2.16 kg.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

In examples 1-4 and comparative experiments A-F, a heterophasic propylene copolymer consisting of a propylene-based matrix of a propylene homopolymer and a dispersed phase of ethylene-propylene copolymer was mixed with erucamide in a twin screw ZE21 extruder. The amount of erucamide was 0.2 wt % with respect to the total composition. 1000 ppm of the processing aid Calcium Stearate and 2000 ppm of stabilizer were mixed with the heterophasic copolymer prior to dosing it to the hopper of the extruder. In examples 2-4 and comparative experiment F, 500 ppm of a nucleating agent Hyperform® HPN-20E™ and 5000 ppm of talc were further added to the extruder. The amounts of the additives are based on the total composition.

The amount of the dispersed phase in the heterophasic copolymer and the amount of ethylene in the dispersed phase as measured by NMR are summarized in Table 1. The MFI of the composition and the matrix phase and the dispersed phase of the heterophasic propylene copolymer determined according to ISO1133 (2.16 kg/230° C.) are also summarized in Table 1. The ethylene content of the heterophasic copolymer as calculated from the amount of the dispersed phase and the ethylene content of the dispersed phase is also included in Table 1.

The temperature profile in the extruder was 20-20-30-50-100-170-220-220-240° C., at a throughput of 2.5 kg/h at 300 rpm. Pellets were obtained from the extruder.

Impact strength was determined by measuring the Izod impact strength at 23° C., 0° C. and −20° C. according to ISO 180 4A. Test geometry: 65*12.7*3.2 mm, notch 45° according to ISO 37/2 perpendicular orientation.

The pellets obtained were dry blended with 2 wt % of a black PE Colour masterbatch. The blends were injection moulded into test specimens using an Arburg 60T injection-moulding machine. For the scratch tests 65*65*3.2 mm thick test plaques were molded.

The VW scratch resistance test was measured according to the PV 3952 2002 scratch method of Volkswagen AG company on an Erichsen scratching device, with a load of 10N, 15N and 20N. The resulting value dL is a measure for the scratch resistance, a low dL value corresponding to high scratch resistance; this means that the scratch does not turn white but keeps the original colour of the scratched plaque. The colour change dL is the difference in the L values of CIELAB measured according to ASTM D6290-05 and ASTM E313.

The flexural modulus (stiffness) was determined according to ASTM D790-10 at 23° C. in parallel orientation (test specimen: 3.2 mm according to ISO 37/2).

Gloss is the amount of light reflected in a certain direction by a surface of a sample made from the composition. The gloss was determined according to ISO 2813 and DIN67530 at a measurement angle of 20°, 60° and 85°. The samples used for this test were obtained by injection moulding ISO 37/2 on the machine Arburg 60T, mould: 1-1-1-108, with geometry 65*65*3.2 mm.

Results are shown in Table 1.

TABLE 1

|  | A | B | C | D | 1 | 2 | E | F | G | 3 | 4 |
|---|---|---|---|---|---|---|---|---|---|---|---|
| ethylene content (wt %) in dispersed phase | 18.1 | 18.1 | 34.9 | 36.5 | 36.5 | 36.5 | 44.7 | 44.7 | 31.5 | 31.5 | 32.4 |
| dispersed phase (wt %) | 24 | 24 | 23.3 | 17.2 | 17.2 | 17.2 | 14.4 | 14.4 | 19.2 | 19.2 | 11.4 |
| ethylene content (wt %) in heterophasic copolymer | 4.3 | 4.3 | 8.1 | 6.3 | 6.3 | 6.3 | 6.4 | 6.4 | 6.0 | 6.0 | 3.7 |
| total MFI (dg/min) | 1.9 | 1.9 | 1.9 | 6.86 | 16.5 | 18.3 | 6.56 | 18.8 | 6.28 | 18.8 | 19.3 |
| matrix MFI (dg/min) | 2.1 | 2.1 | 2 | 8.9 | 8.9 | 8.9 | 8.7 | 8.7 | 8.9 | 8.9 | 9.1 |
| rubber MFI (dg/min) | 1.1 | 1.1 | 1.4 | 2.3 | 2.3 | 2.3 | 1.6 | 1.6 | 1.8 | 1.8 | 1.7 |
| matrix MFI/rubber MFI | 1.9 | 1.9 | 1.4 | 3.9 | 3.9 | 3.9 | 5.4 | 5.4 | 4.9 | 4.9 | 5.4 |
| shifted | no | no | no | no | yes | yes | no | yes | no | yes | yes |
| erucamide | yes | No | yes | yes | yes | yes | yes | yes | yes | yes | yes |
| nucleating agent | no | no | no | no | no | yes | no | yes | no | yes | yes |
| scratch resistance |  |  |  |  |  |  |  |  |  |  |  |
| F = 10N | 0 | 1.49 | 0 |  |  | 0.19 |  | 1.55 |  | 0.07 | 0.02 |
| F = 15N | 0.02 | 7.13 | 0.01 |  |  | 0.21 |  | 8.6 |  | 2.46 | 2.38 |
| F = 20N | 0.08 | 10.98 | 3.78 |  |  | 9.78 |  | 13.07 |  | 13.51 | 12.82 |
| impact strength (kJ/m2) |  |  |  |  |  |  |  |  |  |  |  |
| Izod 23 L | * | 12.32 | 58.15 | 11.4 | 7.2 | 7.5 | 7.3 | 6.5 | 15.2 | 8.6 | 5.1 |
| Izod 0 L | * | 2.58 | 15.7 | 5.1 | 4.2 | 4.5 | 4.9 | 4.5 | 5.8 | 5.4 | 3.5 |
| Izod −20 L | * | 1.76 | 3.78 | 2.6 | 2.8 | 3.2 | 4.2 | 3.8 | 3 | 3.3 | 2.9 |
| Flexural ASTM D790 (II) (MPa) | * | 1302 | 1175 | 1216 | 1221 | 1408 | 1382 | 1528 | 1070 | 1211 | 1593 |
| Gloss 20 | * | 74.9 | 75.1 | 70.7 | 69.4 | 68.6 | 61.8 | 60.1 |  | 69.1 | 65.4 |
| Gloss 60 | * | 86.4 | 86.8 | 83.3 | 82.6 | 82.1 | 80.1 | 77.4 |  | 83.6 | 81.1 |
| Gloss 85 | * | 96.8 | 97.7 | 96.5 | 96.7 | 96.7 | 96.4 | 95.8 |  | 96 | 97.2 |

* expected to be similar to the values of experiment B

It can be understood from the results presented in Table 1 that the compositions according to the invention show a high scratch resistance. The compositions according to the invention further show good impact strength as well as flexural modulus and gloss.

As can be seen from the results in Table 1, the compositions of the invention (wherein the heterophasic propylene copolymer has an MFI in the range of 10-100 dg/min) show a good impact-stiffness balance in combination with a sufficiently high gloss.

By comparison of CEx E and CEx F, it can be seen that the addition of a nucleating agent, in particular a C10-C30 carboxylic acid amide, leads to a higher flexural modulus (stiffness).

In addition, the results show that the presence of a nucleating agent increases the stiffness (flexural modulus as measured in the parallel (II) direction).

The invention claimed is:

1. A composition comprising (A) a heterophasic propylene copolymer and (B) a C10-C30 aliphatic carboxylic acid amide, wherein the heterophasic propylene copolymer consists of:
   (a) a propylene-based matrix,
   wherein the propylene-based matrix consists of a propylene homopolymer and/or a propylene-α-olefin copolymer consisting of at least 70 wt % of propylene and at most 30 wt % of α-olefin, based on the total weight of the propylene-based matrix, and
   wherein the propylene-based matrix is present in an amount of 76 to 90 wt % based on the total heterophasic propylene copolymer, and (b) a dispersed ethylene-α-olefin copolymer,
wherein the dispersed ethylene-α-olefin copolymer is present in an amount of 24 to 10 wt % based on the total heterophasic propylene copolymer,
wherein the sum of the total amount of propylene-based matrix and total amount of the dispersed ethylene-α-olefin copolymer in the heterophasic propylene copolymer is 100 wt %,
wherein the amount of ethylene in the ethylene-α-olefin copolymer is 30 to 38 wt %,
wherein the propylene-based matrix has a melt flow index $MFI_{PP}$ as determined according to ISO1133 at 230° C. and 2.16 kg and the dispersed ethylene-α-olefin copolymer has a melt flow index $MFI_{EPR}$ as determined according to ISO1133 at 230° C. and 2.16 kg, wherein the ratio of $MFI_{PP}/MFI_{EPR}$ is 0.5-15, and
wherein the heterophasic propylene copolymer has a MFI of 10 to 100 dg/min as determined according to ISO1133 at 230° C. and 2.16 kg.

2. The composition according to claim 1, wherein (B) is an unsaturated C10-C30 aliphatic carboxylic acid amide.

3. The composition according to claim 1, wherein the amount of (B) in the composition is 0.01-1 wt % based on the total weight of the composition.

4. The composition according to claim 1, wherein the propylene-based matrix consists of a propylene homopolymer.

5. The composition according to claim 1, wherein the α-olefin in the ethylene-α-olefin copolymer is chosen from the group of α-olefins having 3 to 8 carbon atoms and any mixtures thereof.

6. The composition according to claim 1, wherein $MFI_{PP}$ is 1.5 to 10 dg/min.

7. The composition according to claim 1, wherein $MFI_{EPR}$ is 1 to 3 dg/min.

8. The composition according to claim 1, wherein the amount of ethylene in the heterophasic propylene copolymer is in the range of 3-8 wt % based on the heterophasic propylene copolymer.

9. The composition according to claim 1, wherein the composition comprises at most 4 wt % of glass materials.

10. The composition according to claim 1, wherein the composition comprises a nucleating agent.

11. A process for the preparation of the composition according to claim 1, comprising melt mixing (A) and (B).

12. An article comprising the composition of claim 1.

13. The article according to claim 12, wherein the article is a consumer appliance.

14. The article according to claim 12, wherein the article is made by injection moulding.

15. The composition according to claim 2, the unsaturated C10-C30 aliphatic carboxylic acid amide is selected from the group consisting of erucamide and oleamide.

16. The composition according to claim 5, wherein the α-olefin in the ethylene-α-olefin copolymer is propylene.

17. The composition according to claim 1, wherein the amount of ethylene in the heterophasic propylene copolymer is in the range of 3-7 wt % based on the heterophasic propylene copolymer.

18. The composition according to claim 1, wherein the composition comprises a nucleating composition comprising a first nucleating agent, which comprises a cyclic dicarboxylate salt compound; and a second nucleating agent, which comprises talc, wherein the cyclic dicarboxylate salt compound has the formula (I):

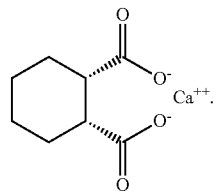

19. The composition according to claim 13, wherein the consumer appliance is selected from the group consisting of household appliances, electrical appliances, and garden power tools.

20. A composition comprising (A) a heterophasic propylene copolymer, (B) 0.01-1 wt % of a C10-C30 aliphatic carboxylic acid amide based on the total weight of the composition, and (C) a nucleating agent, wherein the heterophasic propylene copolymer consists of:

(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix, and
wherein the propylene-based matrix is present in an amount of 76 to 90 wt % based on the total heterophasic propylene copolymer, and (b) a dispersed ethylene-α-olefin copolymer,
wherein the dispersed ethylene-α-olefin copolymer is present in an amount of 24 to 10 wt % based on the total heterophasic propylene copolymer,
wherein the sum of the total amount of propylene-based matrix and total amount of the dispersed ethylene-α-olefin copolymer in the heterophasic propylene copolymer is 100 wt %,
wherein the amount of ethylene in the ethylene-α-olefin copolymer is 30 to 38 wt %,
wherein the propylene-based matrix has a melt flow index $MFI_{PP}$ as determined according to ISO1133 at 230° C. and 2.16 kg is 1.5 to 10 dg/min and the dispersed ethylene-α-olefin copolymer has a melt flow index $MFI_{EPR}$ as determined according to ISO1133 at 230° C. and 2.16 kg is 1 to 3 dg/min, wherein the ratio of $MFI_{PP}/MFI_{EPR}$ is 0.5-15, and
wherein the heterophasic propylene copolymer has a MFI of 10 to 100 dg/min as determined according to ISO1133 at 230° C. and 2.16 kg.

* * * * *